United States Patent [19]
Golser et al.

[11] Patent Number: 5,258,993
[45] Date of Patent: Nov. 2, 1993

[54] GAS LASER

[75] Inventors: Hans Golser, Munich; Klemens Huebner, Ottobrunn; Hans Krueger, Munich, all of Fed. Rep. of Germany

[73] Assignee: Siemens Aktiengesellschaft, Munich, Fed. Rep. of Germany

[21] Appl. No.: 929,133

[22] Filed: Aug. 13, 1992

[30] Foreign Application Priority Data
Sep. 2, 1991 [DE] Fed. Rep. of Germany ... 9110876[U]

[51] Int. Cl.⁵ .............................................. H01S 3/03
[52] U.S. Cl. ................................................... 372/65
[58] Field of Search ........................... 372/61, 65, 92

[56] References Cited
U.S. PATENT DOCUMENTS

| | | | |
|---|---|---|---|
| 4,553,240 | 11/1985 | Schmid | 372/65 |
| 4,734,915 | 3/1988 | Mefferd et al. | 372/65 |
| 5,097,474 | 3/1992 | Welsch et al. | 372/65 |

FOREIGN PATENT DOCUMENTS 3914668 11/1990 Fed. Rep. of Germany.

Primary Examiner—Léon Scott, Jr.
Attorney, Agent, or Firm—Hill, Steadman & Simpson

[57] ABSTRACT

A gas laser has a laser tube which has one end extending into a connecting flange of the reservoir and the laser tube is soldered to the flange by a circumferential soldering. This structure will reduce intensity fluctuations of the laser, which is preferably an argon laser.

7 Claims, 1 Drawing Sheet

GAS LASER

BACKGROUND OF THE INVENTION

The present invention is directed to a gas laser having integrated mirrors rigidly connected to a reservoir of the laser, said reservoir being fixed vis-a-vis the mounting plate by a holder at least at one location, and including reinforcements for dampening mechanical oscillations having a frequency from 10 Hz through 1000 Hz, one end of the laser tube joining the reservoir and an anode tube joining the other end of the laser tube and the laser tube is mechanically rigidly joined to cooling plates.

A gas laser having a gas reservoir connected to one end and an anode tube connected to the other end with cooling plates attached to the laser tube and with a holder for the reservoir and the anode tube having means for dampening mechanical oscillations having a frequency of 10 Hz to 1000 Hz is disclosed in German OS 39 14 668.

SUMMARY OF THE INVENTION

The object of the present invention is to provide an improvement in the chronological consistency of the intensity of the laser and to simplify the embodiment of the laser. This object is achieved in an improvement in a gas laser having a reservoir with an integral mirror, the reservoir being fixed vis-a-vis a mounting plate by a holder at least at one location, with the holder having reinforcing means for dampening mechanical oscillations having a frequency of 10 Hz through 1000 Hz, a laser tube being joined at one end to the reservoir and having an anode tube joined at the other end, and said laser tube being mechanically rigidly joined to cooling plates. The improvements comprising the reservoir containing a connecting flange, said laser tube extending into the connecting flange and the laser tube being soldered to the connecting flange by a circumferential soldering.

The invention is based on the perception that intensity fluctuations of a gas laser, particularly of an argon laser, can be diminished or eliminated by dampening mechanical oscillations of the laser housing. The mechanical oscillations of the laser can lead to a rhythmic tilting of the mirror. This will, in turn, lead to an undesired modulation of the laser emission.

Due to market demands, narrow limits are placed on measures for attenuating the mechanical oscillations. The laser power, the beam diameter, the useful life and the oscillation in only one laser mode, which is the fundamental mode, are required. The dampening elements and reinforcements, according to the above-mentioned German OS 39 14 688.5, increases the weight of the laser and, in particular, the additionally applied reinforcements increase the mass of the laser capable of oscillating over and above this. Proceeding from this state in the developments, the object of the laser conforming to the present invention is achieved in that the reservoir contains the connecting flange, the laser tube extends into this connecting flange and the tube is soldered to the connecting flange by a circumferential soldering.

Advantageously, the inside wall of the flange has a diameter step, whereby the laser tube presses against this diameter step. A precise positioning of the laser tube is, thus, achieved.

An additional reinforcement or stiffening is achieved in that the end region of the laser tube has a flange-like widening portion and in that the laser tube extends into this widened portion and is soldered thereto with a circumferential soldering. The oblique transition from the flange-like part to the actual anode tube is thereby recommendable. A further reduction in the tendency toward oscillation is achieved in that the cooling plates are fashioned so thin that there is a risk of a bending of the cooling plates, given the mechanical stresses to be anticipated, and in that spacers having a low deadweight will prevent a disturbing bending of these cooling plates. A disturbing bending of the cooling plates is particularly established when neighboring cooling plates press against one another and deteriorate the access of the cool air. Clips or tabs integrally applied to or in the cooling plates advantageously serve as spacers. Such tabs can be punched into the cooling plates at any desired location or can be applied to the edge of the cooling plate and be bent over. Spacers arranged at the edges of the cooling plates are advantageously constructed to be considerably narrower than the cooling plates themselves so that weight is eliminated.

Cooling plates are, likewise, advantageously arranged on the anode tube, wherein the elements for supplying the anode voltage is attached to one of these cooling plates. A first holder is secured to the anode tube outside of the cooling plates, and a second holder is attached to the reservoir. The second holder advantageously has the form of stiffly-fashioned clamps, whereby the reservoir is supported against the holder in a point-like fashion at a plurality of locations on the basis of a ductile and/or rubber-elastic dampening material.

Other advantages and features of the invention will be readily apparent from the following description of the preferred embodiments, the drawings and claims.

DESCRIPTION OF THE PREFERRED EMBODIMENTS

Figure 1:
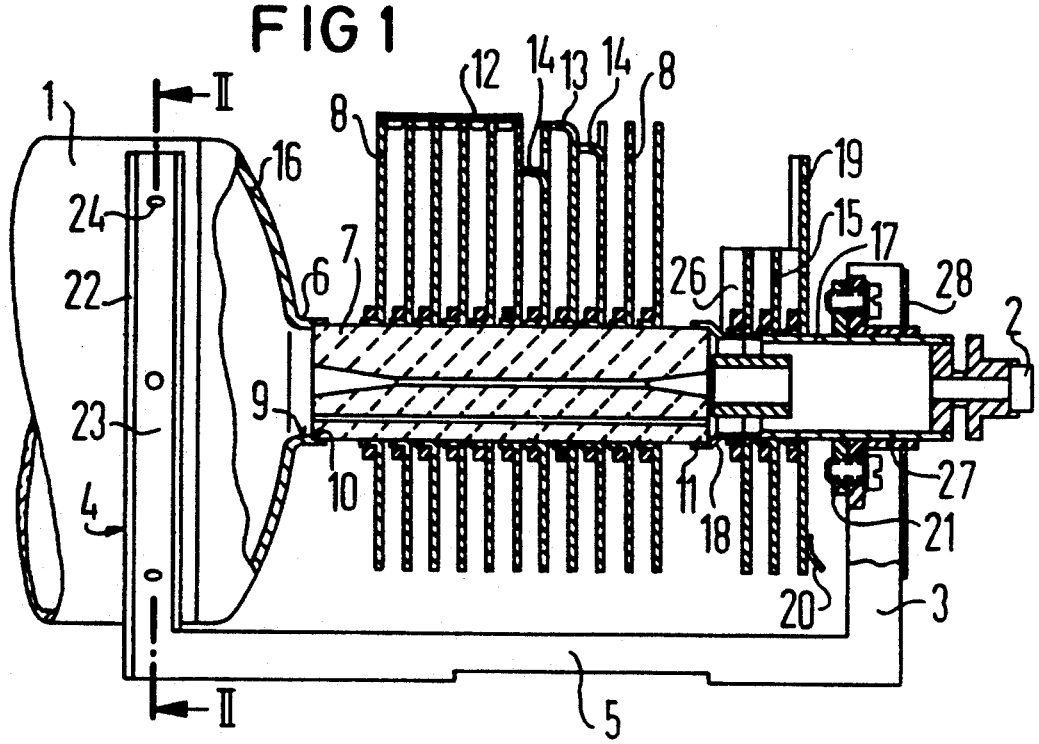
FIG. 1 is a side view with portions broken away of a laser in accordance with the present invention.

The laser of the present invention is constructed with a reservoir 1 which has a metal cap 16 to which a connecting flange 6 is applied. The connecting flange 6 will embrace a laser tube 7 and is connected thereto in a vacuum-tight fashion by a circumferential soldering. The laser tube 7 presses against a diameter step 10, which is formed on the inside wall of the connecting flange 6 and, thus, is fixed in an axial direction vis-a-vis the reservoir 1. The other end of the laser tube 7 is connected to an end region 11 of an anode tube 17, and the end region 11 has an enlarged diameter. The end region 11 surrounds the end of the laser tube 7 and is connected thereto in a vacuum-tight fashion with a circumferential soldering. The end region 11 contains a stop 18 which fixes the axial position of the tube 7 vis-a-vis the anode tube 17.

Cooling plates 8 are joined to the laser tube 7 and are executed so thinly that they can be bent upon manipulation of the laser. The cooling plates 8 are supported against one another by spacers 12 or, respectively, by clips or tabs 13 and 14, which serve as spacers. The spacers 12 are parts applied from the outside and are, for example, plastic strips having appropriate cuts for receiving the edges of the plates or fins 8. The clip 13 is applied to the cooling plate 8 and bent over. The clip 14 is punched or cut from the cooling plate as a tab. Expediently, the clips 13 and 14 are significantly narrow in the direction perpendicular to the plane of the drawing than are the cooling plates or fins 8. Every cooling plate 8 can, therefore, contain a plurality of clips 13 or 14.

The anode tube 17 has applied thereto a plurality of cooling plates 15 and a cooling plate 19. The cooling plate 19 is expediently the outermost cooling plate of the laser and is, thus, easily accessible for fastening tools and, as illustrated, contains an electrical anode terminal 20. Spacers 26 are placed between the plates 15 and between the plates 15 and 19.

The laser is secured to a mounting plate 5 with two holders 3 and 4. The holder 3 is fixed at the anode tube 17. To this end, a ring 21 is joined to the anode tube 17 with a material bond or is integral therewith, and the holder 3 is screwed to this ring 21. The holder 3 expediently contains an insulator ring 27 in order to isolate the anode voltage vis-a-vis the mounting plate 5. A steel spring sheet 28 elastically connects the insulator ring 27 to the rest of the holder in an axial fashion.

Figure 2:
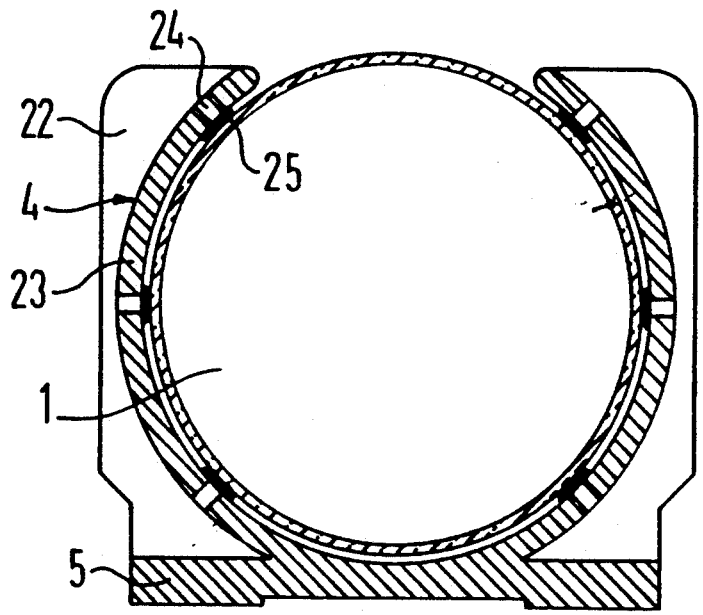
FIG. 2 is a cross sectional view taken along the lines II—II of FIG. 1.

The other holder 4 embraces the reservoir 1 and is secured to the mounting plate 5. The holder 4 is fashioned to be especially stiff. For example, as illustrated in FIG. 2, the holder comprises reinforcements 22 between which a cylindrical region 23 is enclosed. The cylindrical region 23 has a plurality of spaced bores 24 and dampening compound 25 injected through the bores after the insertion of the reservoir 1. The dampening compound 25 will press against the reservoir 1 only in a punctiform fashion. A stable, oscillating dampening and gentle holding of the reservoir 1 will, thus, occur. Preferably, for an argon laser the reservoir is composed of glass.

The totality of the features act in common to avoid oscillation in the disturbing frequency range up to 2 kHz at the laser mirror 2 on the end of the anode tube 17. The measures create a stiffening of the laser and a dampening of the oscillatory capability in the disturbing frequency range.

Although various minor modifications may be suggested by those versed in the art, it should be understood that we wish to embody within the scope of the patent granted hereon all such modifications as reasonably and properly come within the scope of our contribution to the art.

We claim:

1. In a gas laser having a laser tube secured to a reservoir at one end and an anode tube at the other end, said reservoir having integral mirrors rigidly connected thereto, a mounting plate including a first holder for fixing the reservoir at one location and including reinforcements for dampening mechanical oscillations having a frequency from 10 Hz through 1000 Hz, said laser tube being mechanically rigidly joined to cooling plates, the improvements comprising the reservoir containing a connecting flange, said laser tube extending into the connecting flange and the laser tube being soldered to the connecting flange by a circumferential soldering.

2. In a gas laser according to claim 1, wherein the inside wall of the connecting flange has a diameter step and the laser tube presses against said diameter step.

3. In a gas laser according to claim 1, wherein the anode tube has an end region with a widened flange, said laser tube extending into the end region of the anode tube and being soldered thereto by a circumferential soldering.

4. In a gas laser according to claim 1, wherein the cooling plates are thinly fashioned so that given mechanical stresses to be anticipated, there is a risk of bending of the cooling plates, said gas laser including spacers having a low weight being provided to prevent a disturbing bending of said cooling plates.

5. In a gas laser according to claim 4, wherein the spacers are integrally formed tabs in the cooling plates.

6. In a gas laser according to claim 1, wherein the cooling plates are arranged on the anode tube, said anode tube having an anode terminal which is connected to one of said cooling plates, and a second holder is secured to the anode tube outside of the cooling plates and the first holder is attached to the reservoir.

7. In a gas laser according to claim 6, wherein the first holder has the shape of a stiffly fashioned clamp, the reservoir supported in said first holder in a punctiform fashion at a plurality of locations on the basis of a ductile and/or a rubber elastic dampening material.

* * * * *